No. 757,144. PATENTED APR. 12, 1904.
W. G. RICHARDSON.
MIXING MACHINE.
APPLICATION FILED OCT. 12, 1903.
NO MODEL.

Witnesses:
Inventor:
William G. Richardson
By Benedict & Morsell
Attorneys

No. 757,144.                                    Patented April 12, 1904.

UNITED STATES PATENT OFFICE.

WILLIAM G. RICHARDSON, OF MILWAUKEE, WISCONSIN.

MIXING-MACHINE.

SPECIFICATION forming part of Letters Patent No. 757,144, dated April 12, 1904.

Application filed October 12, 1903. Serial No. 176,588. (No model.)

*To all whom it may concern:*

Be it known that I, WILLIAM G. RICHARDSON, residing at Milwaukee, in the county of Milwaukee and State of Wisconsin, have invented a new and useful Improvement in Mixing-Machines, of which the following is a description, reference being had to the accompanying drawings, which are a part of this specification.

My invention has relation to improvements in mixing-machines adapted especially for mixing and kneading the batter for cakes, puddings, and the like.

The object is to provide an improved construction of such character as to effect the kneading and mixing operation in a thorough and expeditious manner; and with this primary object and other incidental objects in view the invention consists of the devices and parts or their equivalents as hereinafter set forth.

Figure 1:
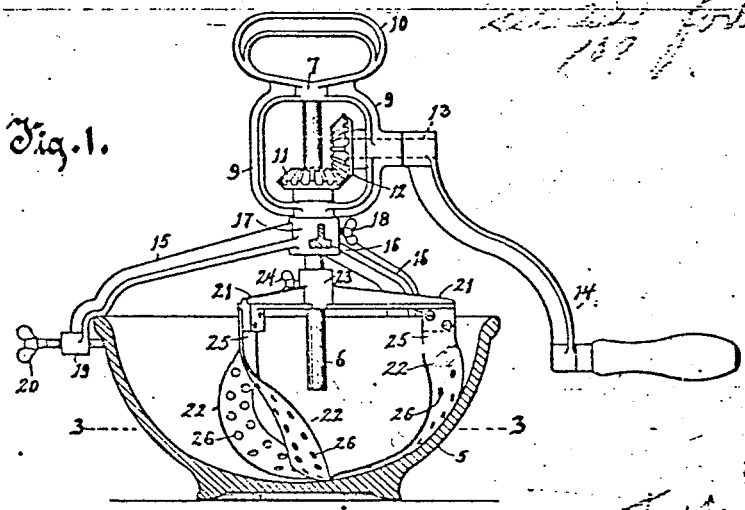
Figure 2:
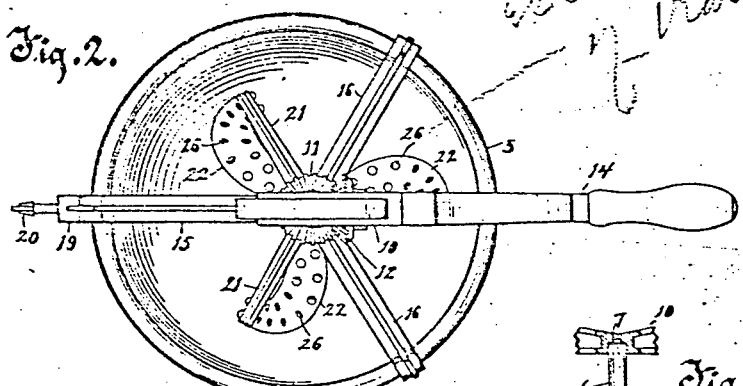
Figure 3:
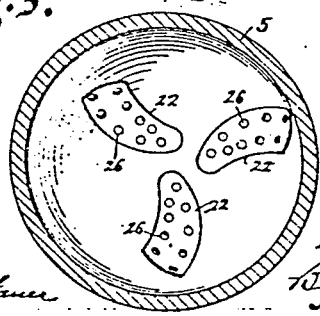
Figure 4:
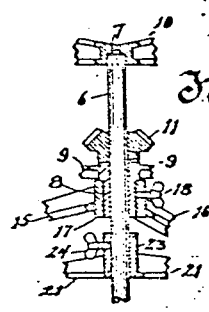

In the accompanying drawings, Figure 1 is an elevation of my invention, one of the securing-arms of the bowl-bracket being in cross-section and the bowl to which the device is applied being in vertical section. Fig. 2 is a plan view of the device and the bowl to which the same is applied. Fig. 3 is a cross-section on the line 3 3 of Fig. 1; and Fig. 4 is an elevation of the operating-shaft and parts carried by the shaft, the said parts being in section.

Referring to the drawings, the numeral 5 indicates the bowl to which the mixer is adjusted and which bowl is adapted to contain the batter or materials to be mixed.

The stirring-shaft of the mixer is indicated by the numeral 6. This shaft may be mounted in any suitable form of bearings and may be rotated through any desirable means. In the drawings I show a convenient form of bearings consisting of the upper and lower sleeves or boxes 7 and 8, respectively, connected by the outwardly-bowed arms 9 and the upper bearing having extending upwardly therefrom and integral or rigid therewith a handle 10.

The means shown in the drawings for rotating the shaft 6 consists of a beveled gear 11, mounted fast on the shaft and located thereon just above the lower bearing sleeve or box 8, said beveled gear 11 being in mesh with a similar gear 12 on the inner end of a drive-shaft 13, said shaft having its bearing in one of the outwardly-bowed arms 9 and operated by means of a suitable handle or crank 14.

As above suggested, the particular form of bearings for the stirrer or mixer shaft and the particular means for rotating said shaft shown in the drawings and above described are not essential, inasmuch as any desirable form of bearings and any desirable means for rotating the shaft may be employed. For instance the shaft may be rotated by means of a crank or other power applied directly to the upper end of said shaft.

The bracket for connecting the device to the bowl containing the materials to be mixed consists of one long arm 15 and two shorter arms 16 16, the said arms radiating from a hub 17, which hub surrounds the lower bearing sleeve or box 8 and is detachably secured thereto by means of a set-screw 18, turning through a threaded opening in the hub and engaging at its inner end against the said bearing. By the provision of the long arm and the two shorter arms radiating from a common hub the stirrer-shaft when the bracket is applied to a bowl is necessarily thrown to an eccentric position with relation to the bowl, and the stirring or mixing mechanism carried by said shaft and hereinafter referred to is also necessarily eccentrically disposed. For securely and removably fastening the bracket to the bowl two of the arms of said bracket at their outer ends are of slightly-hooked form, so as to engage over the rounded upper rim or edge of the bowl, while the other arm, preferably the longer one, is provided at its outer end with a downwardly-extending lug 19, having a threaded opening through which a set-screw 20 is adapted to be turned, so that the inner end of said screw will impinge against the outer side of the bowl just below the upper rim of said bowl.

The stirring or mixing mechanism consists of a series of arms 21, radiating from the stirrer-shaft, and a series of mixing-blades 22, one blade depending from the outer end of each radiating arm. The radiating arms are preferably adjustably mounted on the shaft so that the blades may be made to adapt themselves to different depths of bowls, and in order to provide for this adjustability the said arms radiate from a hub 23, which is adjustably secured to the stirrer-shaft by means of a set-screw 24. It will be noticed that each mixing-blade depends from the outer end of each radiating arm in a straight line downwardly for a slight distance, as indicated by the numerals 25, while for the balance of its length each blade is disposed at an angle oblique to the radial arm from which it depends. It will be further noted that the outer edge of each blade, or the edge thereof which is closest to the side of the bowl, is convex throughout the oblique portion of the blade, while the inner edge, or the edge farthest removed from the side of the bowl, is preferably concaved throughout the oblique portion of the length of the blade. It will also be seen clearly by Fig. 3 of the drawings that each blade is concavo-convex in cross-section, the convex side being outermost, whereby a better rubbing effect is produced by the blade. Each blade is also provided throughout its surface with a series of openings 26.

In the use and operation of my invention the flour, seasoning, and liquids constituting the batter are placed in the bowl. The stirrer-shaft is then rotated in a direction to cause the inner edge, or the edge of each blade farthest removed from the bowl, to be the advancing edge, which by the particular driving means shown in the drawings is accomplished by turning the crank 14 away from the operator. For the purpose of making the operation clear it will be assumed that one of the blade-carrying arms is beneath and parallel with the longer arm 15 of the bracket at the beginning of the operation. At this position said blade is at the maximum distance away from the inner side of the wall of the bowl. Following the course of this blade in its travel around the bowl, it will be evident that as said blade leaves its position beneath the long arm and travels away from said arm it will approach nearer and nearer to the wall of the bowl, and when it reaches the first short arm and is beneath and parallel with said arm its outer convex edge will bear firmly against the wall of the bowl, and this bearing contact will be maintained in the travel of the blade in the space from the first short arm to the other, and as the blade travels away from the latter arm the distance between said blade and the wall of the bowl gradually increases, and by the time the blade again passes beneath and is parallel with the long arm of the bracket said blade will have again reached its maximum distance from the side of the bowl. From this description of the operation it will be evident that during a fractional part of the circular travel of each blade it approaches nearer and nearer to the wall of the bowl, that in a succeeding fractional part of the travel of the blade its outer edge is in bearing contact with the wall of the bowl, and that in the remaining fractional part of the travel of the blade the distance between said blade and the wall of the bowl gradually increases. The effect of this operation is as follows: By reason of the oblique angle at which each blade is disposed the said blade, starting from its position beneath the long arm of the bracket, will gradually approach toward the side of the bowl, and consequently gather a quantity of the dough or batter between its outer side and the inner side of the bowl and gradually press said batter toward and against the side of the bowl, the outer edge of the blade at the same time gradually working toward the side of the bowl, until the blade reaches a position beneath the first short arm.
At this time the outer edge of said blade will be in bearing contact with the wall of the bowl, and this bearing contact will continue with the travel of the blade in the space bounded between the two short arms of the bracket, and consequently during this portion of the movement of the blade the mass of material is more effectually confined between the outer side of the blade and the wall of the bowl, and hence is subjected to a most thorough rubbing and kneading action against the side of the bowl and all lumps or hard particles are effectually ground or reduced. The convex shape of the outer edge of each blade enables said outer edge to accurately conform to and contact with the wall of the bowl during the period of travel in the space between the two short arms of the bracket. After the blade passes beneath the second short arm of the bracket its distance from the wall of the bowl, as stated, gradually increases and the outer edge of said blade gradually works away from the wall of the bowl, and consequently the mass of material beneath the blade is permitted to gradually escape or pass between said outer edge and the wall of the bowl. Such of the mass of material acted upon by the blades in their circular path of travel and which does not get beneath the blades is turned over the upper side of said blades, and particularly is this true when a blade is traveling in the space bounded by the two short arms of the bracket. Also some of the mass of material during the travel of the blades oozes through the openings of said blades, and the material so oozing through the openings meets the material thrown over the inner sides of the blades and thus causes air-bubbles to accumulate in the batter, and thereby lighten the dough. The inner edge of each blade is advantageously made concave, inasmuch as if this edge were straight it would make the blade so wide as to accumulate thereunder too large a mass of the material, which would result not only in rendering the operation of turning the blades in a circular path more difficult, but at the same time would lessen the effectiveness of the operation of mixing. It will be further noted that each blade gradually approaches nearer and nearer to the surface of the bowl from the upper edge of said blade downwardly, so that when a blade reaches the eccentric position or the space between the two short arms of the bracket the entire convex outer edge of each blade is made effective—that is to say, the entire convex edge longitudinally will be in bearing contact with the side of the bowl. A further result of the operation is that if after one blade passes the space wherein its outer edge bears against the side of the bowl, or, in other words, the space bounded by the two short arms of the bracket, the material beneath said blade will pass or escape by the outer edge of the blade and will be caught by the next succeeding blade of the series, and hence any hard lumps which may not have been reduced or ground by the action of the preceding blade will be again subjected to a rubbing or grinding operation by said succeeding blade.

The blades are preferably made of spring-steel, so as to give more or less flexibility thereto, the yielding being desirable in order to render each blade capable of a steady rubbing action against the side of the bowl in view of the fact that the flexibility or yielding capability allows the blade to adjust itself to the shape of the side of the bowl.

It will be noticed that the bracket comprising the hub 17, the long arm 15, and the short arms 16 is readily removable or detachable from the stirrer-shaft and that the bracket carrying the stirring-blades is also detachable from said shaft. This provides for removing the brackets referred to and substituting other brackets therefor to fit a different size of bowl.

What I claim as my invention is—

1. In a mixing-machine, the combination of a bracket adapted to be adjusted above a bowl or other receptacle, a shaft revoluble in said bracket and eccentrically mounted therein, arms extending outwardly from the shaft and rotatable therewith, and stirrer-blades depending from the arms and extending into the bowl, said blades being so constructed that, in conjunction with the eccentric mounting of the shaft, each of said blades in its circular path of travel around the bowl is for a fractional part of its travel caused to approach nearer and nearer to the side of the bowl, for another fractional portion of its travel to have its outer edge in contact with the wall of the bowl, and for the remaining fractional portion of its circular path of travel to gradually increase its distance from the side of the bowl until the terminal point of one complete circular path of travel is reached, at which point the blade is at its maximum distance from the side of the bowl.

2. In a mixing-machine, the combination of a bracket adapted to be adjusted above a bowl or other receptacle, a shaft revoluble in said bracket and eccentrically mounted therein, arms radiating outwardly from the shaft and rotatable therewith and stirrer-blades depending from the arms and extending into the bowl and set at an angle oblique to the radial arms, said blades being so constructed that, in conjunction with the eccentric mounting of the shaft, each of said blades in its circular path of movement around the bowl is caused for a fractional part of its travel to approach nearer and nearer to the side of the bowl, for another fractional portion of its travel to have its outer edge in contact with the wall of the bowl, and for the remaining fractional portion of its circular path of travel to gradually increase its distance from the side of the bowl until the terminal point of one complete circular path of travel is reached, at which point the blade is at its maximum distance from the side of the bowl.

3. In a mixing-machine, the combination of a bracket adapted to be adjusted above a bowl or other receptacle, a shaft revoluble in said bracket and eccentrically mounted therein, arms radiating outwardly from the shaft and rotatable therewith, and stirrer-blades depending from the arms and extending into the bowl, said blades being concavo-convex in cross-section, with the convexity outermost, and said blades being so constructed that, in conjunction with the eccentric mounting of the shaft, each of said blades in its circular path of travel around the bowl is caused for a fractional part of its travel to approach nearer and nearer to the side of the bowl, for another fractional portion of its travel to have its outer edge in contact with the wall of the bowl, and for the remaining fractional portion of its circular path of travel to gradually increase its distance from the side of the bowl until the terminal point of one complete circular path of travel is reached, at which point the blade is at its maximum distance from the side of the bowl.

4. In a mixing-machine, the combination of a bracket adapted to be adjusted above a bowl or other receptacle, a shaft revoluble in said bracket and eccentrically mounted therein, arms extending from the shaft and rotatable therewith, and stirrer-blades depending from the arms and extending into the bowl, said blades having a series of openings therethrough, and said blades being so constructed that, in conjunction with the eccentric mounting of the shaft, each of said blades in its circular path of travel around the bowl is caused for a fractional part of its travel to approach nearer and nearer to the side of the bowl, for another fractional portion of its travel to have its outer edge in contact with the wall of the bowl, and for the remaining fractional portion of its circular path of travel to gradually increase its distance from the side of the bowl until the terminal point of one complete circular path of travel is reached, at which point the blade is at its maximum distance from the side of the bowl.

5. In a mixing-machine, the combination of a bracket adapted to be adjusted above a bowl or other receptacle, a shaft revoluble in said bracket and eccentrically mounted therein, arms extending outwardly from the shaft and rotatable therewith, and stirrer-blades depending from the arms and extending into the bowl, said blades at their upper ends being farthest away from the wall of the bowl and gradually approaching nearer said wall of the bowl toward their lower ends, and said blades being so constructed that, in conjunction with the eccentric mounting of the shaft, each of said blades in its circular path of travel around the bowl is for a fractional part of its travel caused to approach nearer and nearer to the side of the bowl, for another fractional portion of its travel to have its outer edge in contact with the wall of the bowl, and for the remaining fractional portion of its circular path of travel to gradually increase its distance from the side of the bowl until the terminal point of one complete circular path of travel is reached, at which point the blade is at its maximum distance from the side of the bowl.

6. In a mixing-machine, the combination of a bracket adapted to be adjusted above a bowl or other receptacle, a shaft revoluble in said bracket and eccentrically mounted therein, arms radiating outwardly from the shaft and rotatable therewith, and stirrer-blades depending from the arms and extending into the bowl, and set at angles oblique to the radial arms, the inner edges of the blades being concave, and said blades being so constructed that in conjunction with the eccentric mounting of the shaft each of said blades in its circular path of travel around the bowl, is for a fractional part of its travel, caused to approach nearer and nearer to the side of the bowl, for another fractional portion of its travel to have its outer edge in contact with the wall of the bowl, and for the remaining fractional portion of its circular path of travel to gradually increase its distance from the side of the bowl until the terminal point of one complete circular path of travel is reached, at which point the blade is at its maximum distance from the side of the bowl.

7. In a mixing-machine, the combination of a bracket adapted to be adjusted above a bowl or other receptacle, a shaft revoluble in said bracket and eccentrically mounted therein, arms radiating outwardly from the shaft and rotatable therewith, and stirrer-blades depending from the arms and extending into the bowl, said blades being concavo-convex in cross-section and having their outer edges convex, and said blades being farthest away from the wall of the bowl at their upper ends, and gradually approaching nearer the wall of the bowl toward their lower ends, the said construction of the blades, in conjunction with the eccentric mounting of the shaft causing each blade in its circular path of travel around the bowl to approach nearer and nearer to the side of the bowl for a fractional part of its travel, to have its outer edge in contact with the wall of the bowl for another fractional portion of its travel, and to gradually increase its distance from the side of the bowl for the remaining fractional portion of its circular path of travel, until the terminal point of one complete circular path of travel is reached, at which point the blade is at its maximum distance from the side of the bowl.

8. In a mixing-machine, the combination of a bracket comprising a hub, a long arm radiating from the hub, and two short arms also radiating from the hub, the outer ends of said arms adapted to engage the rim of a bowl or other receptacle, a stirrer-shaft revolubly mounted in the hub, arms extending from the stirrer-shaft, and stirrer-blades depending from said arms and extending into the bowl, said blades being so constructed that, in conjunction with the eccentric mounting of the shaft, each of said blades in its circular path of travel around the bowl from the space between the long arm and one short arm being caused to approach nearer and nearer to the side of the bowl, in the space bounded between the two short arms to have its outer edge in contact with the wall of the bowl, and in the space between the last short arm and the long arm, to have its distance from the wall of the bowl gradually increased, until the terminal point of one complete circular path of travel is reached, at which point the blade is at its maximum distance from the side of the bowl.

In testimony whereof I affix my signature in presence of two witnesses.

WILLIAM G. RICHARDSON.

Witnesses:
A. L. MORSELL,
ANNA F. SCHMIDTBAUER.